US007222715B2

(12) United States Patent
Madden et al.

(10) Patent No.: US 7,222,715 B2
(45) Date of Patent: May 29, 2007

(54) FRUIT HANDLING EQUIPMENT

(75) Inventors: Ian Robert Madden, Bacchus Marsh (AU); Charles Edward Esson, Ballarat (AU); Peter Gary Brown, Mount Egerton (AU); Lester Welton, Bacchus Marsh (AU)

(73) Assignee: Color Vision Systems Pty Ltd, Victoria (AU)

( * ) Notice: Subject to any disclaimer, the term of this patent is extended or adjusted under 35 U.S.C. 154(b) by 115 days.

(21) Appl. No.: 10/518,854

(22) PCT Filed: May 30, 2003

(86) PCT No.: PCT/AU03/00679

§ 371 (c)(1),
(2), (4) Date: Jul. 12, 2005

(87) PCT Pub. No.: WO2004/002861

PCT Pub. Date: Jan. 8, 2004

(65) Prior Publication Data

US 2006/0042910 A1    Mar. 2, 2006

(30) Foreign Application Priority Data

Jun. 26, 2002    (AU) .................................... PS3196

(51) Int. Cl.
*B65G 47/40*    (2006.01)
*B65G 47/244*    (2006.01)
*G01G 19/00*    (2006.01)
*B07C 5/16*    (2006.01)

(52) U.S. Cl. ................. 198/370.04; 198/385; 198/387; 198/959; 209/593; 209/912; 177/145

(58) Field of Classification Search ..............................
198/370.04–370.07, 385, 387, 959; 209/592–596, 209/912; 177/145
See application file for complete search history.

(56) References Cited

U.S. PATENT DOCUMENTS

| 3,360,106 | A | * | 12/1967 | Harrison et al. ....... 198/370.04 |
| 5,244,100 | A | | 9/1993 | Regier et al. |
| 5,306,877 | A | | 4/1994 | Tas |
| 5,477,955 | A | | 12/1995 | Madden |
| 5,626,238 | A | | 5/1997 | Blanc |
| 5,677,516 | A | * | 10/1997 | Leverett ...................... 177/52 |
| 5,878,863 | A | | 3/1999 | Madden |
| 6,079,542 | A | * | 6/2000 | Blood ........................ 198/384 |
| 6,234,297 | B1 | * | 5/2001 | Blanc .................... 198/370.04 |
| 6,374,983 | B1 | | 4/2002 | Morigi |

* cited by examiner

FOREIGN PATENT DOCUMENTS

AU    37549/97    3/1998

*Primary Examiner*—Mark A. Deuble
(74) *Attorney, Agent, or Firm*—Stites & Harbison PLLC; Douglas E. Jackson

(57) ABSTRACT

A conveying assembly for fruit handling, comprising a carriage (20) adapted to be attached to a conveying chain arranged to displace the carriage in a conveying direction, a cup (30) adapted to support a single piece of fruit, the cup being secured to the carriage via a parallelogram linkage (41, 42, 22, 35) extending transversely to the conveying direction, the cup being pivotally secured to the linkage to be moveable from a conveying position to a discharge position, the linkage having release means (60) to cause the cup to pivot relative to the linkage transversely of the conveying direction to the discharge position to effect discharge of the fruit, the linkage allowing the cup to be vertically displaceable to effect weighting of the fruit.

17 Claims, 8 Drawing Sheets

FRUIT HANDLING EQUIPMENT

INTRODUCTION

This invention relates to fruit handling equipment and more particularly to conveyor systems for use in such equipment.

BACKGROUND OF THE INVENTION

Fruit handling equipment conventionally comprises a conveyor that includes a plurality of fruit carrying cups that support fruit that can be transported from one end of the conveyor to another. It is usual that the fruit is caused to rotate through a photographic zone and is then passed through a weighing zone. A computer sorts the fruit by weight, size and blemish and determines when the fruit should be discharged from the carrying cups to suitably positioned discharge bins along the length of the conveyor. The cups include a tipping mechanism to effect discharge.

There are a number of patents that disclose this kind of equipment of which the following contain typical disclosures: Australian patents 649963, 656424, 658686, 696009, 701354.

There is however an ongoing need to improve the accuracy and efficiency of this type of equipment. The accuracy of weighing fruit is of particular concern. The high speeds at which this equipment operates also lead to potential damage to the fruit or premature discharge that results in the same effect.

It is these considerations that have brought about the present invention.

SUMMARY OF THE INVENTION

According to one aspect of the present invention there is provided a conveying assembly for fruit handling equipment comprising a carriage adapted to be attached to a conveying chain arranged to displace the carriage, a cup adapted to support a single piece of fruit, the cup being secured to the carriage via a parallelogram linkage extending transversely to the conveying direction, the cup being pivotally secured to the linkage, means to cause the cup to pivot relative to the linkage transversely of the conveying direction to effect discharge, the linkage allowing the cup to be vertically displaceable to effect weighing of the fruit.

Preferably, rollers are positioned adjacent either side of the cup in the conveying direction, the rollers being vertically displaceable to assume an upper position in which the rollers lift the fruit clear of the cup. The assembly preferably also includes means to cause rotation of the rollers to rotate the fruit at the upper position.

Preferably, the cup has a concave support surface supported by a centrally positioned post, the post being pivotally secured to the carriage via the parallelogram linkage.

In a preferred embodiment the parallelogram linkage comprises each arm having ends pivotally connected to the post and the carriage.

Preferably, the lower arm has an elbow joint which can be displaced to a bent configuration thus causing the post and cup to tilt to effect discharge.

The rollers are preferably interconnected by a double 'Z' shaped bar that is supported by the carriage to axially pivot to raise/lower the rollers, the support of the bar allowing vertical displacement of the bar.

DESCRIPTION OF THE DRAWINGS

An embodiment of the present invention will now be described by way of example only with reference to the accompanying drawings in which.

Figure 9:
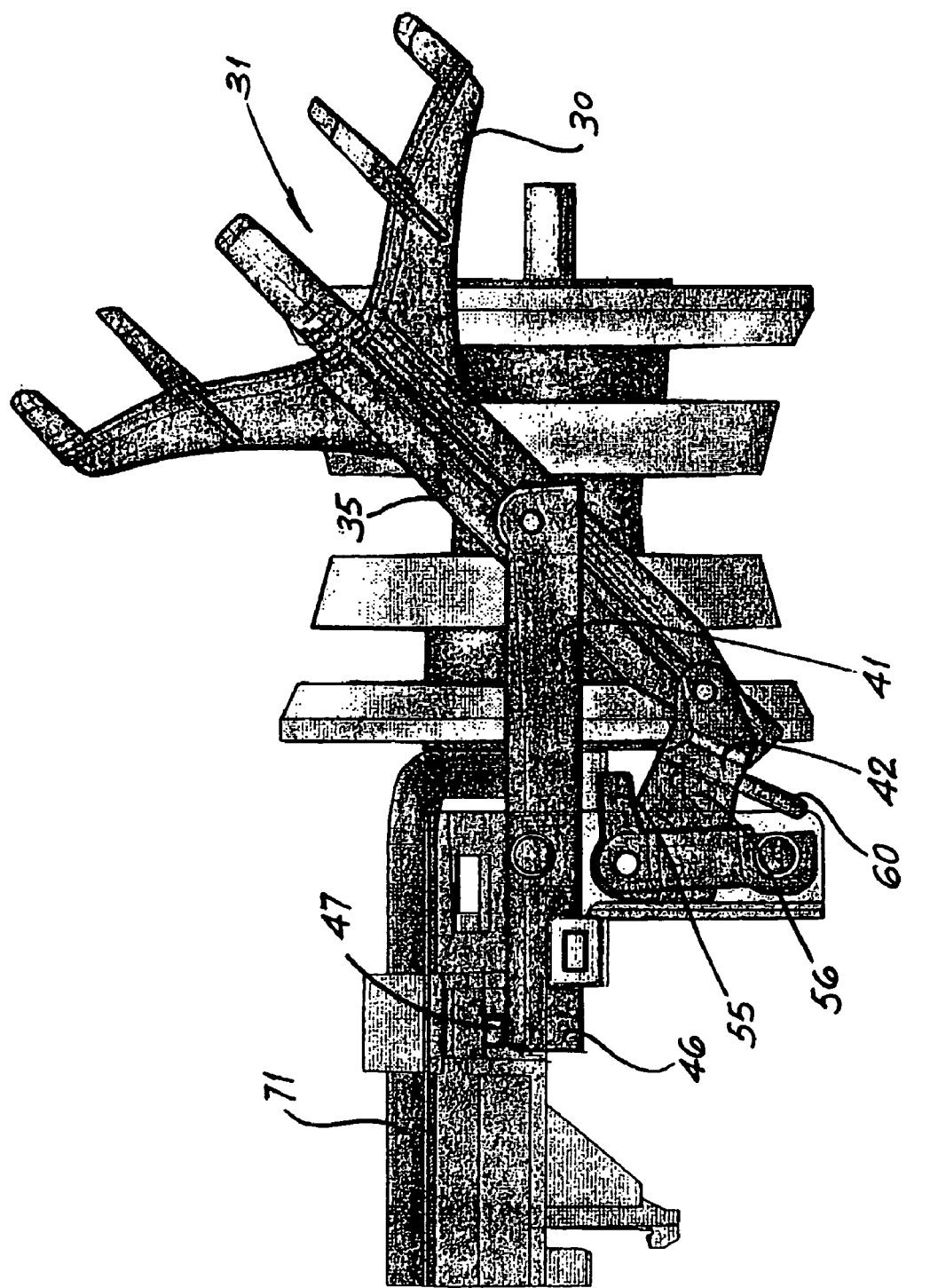
FIG. 9 is an end elevational view of one half of the cup in an eject or fully tilted position.

The accompanying drawings illustrate fruit handling equipment especially for use in the sorting and weighing of fruit such as apples. The fruit handling equipment comprises an endless conveyor on which is clipped a series of carriages 20. The conveyor is driven about spaced sprockets. Each carriage 20 supports a fruit carrying cup 30 on each side. Each carriage 20 also supports rollers 70 on each side that can lift the fruit clear of the carrying cups 30 and rotate the fruit past a camera in a photographic zone (FIG. 10) allowing the fruit to be viewed for size and blemish. The conveyor also includes a weighing zone (FIG. 3) in which the fruit carrying cups pass over a load cell W. A solenoid (not shown) can be activated to cause the fruit carrying cups 30 to tip (FIG. 9) to eject selected fruit off the conveyor. The conveyor is run by a computer that ensures that the fruit is sorted by size, weight and blemish at high speed as it moves along the conveyor.

Equipment of the kind described above is disclosed in a number of the applicant's earlier patents including AUB 658686 and 696009.

Figure 1:
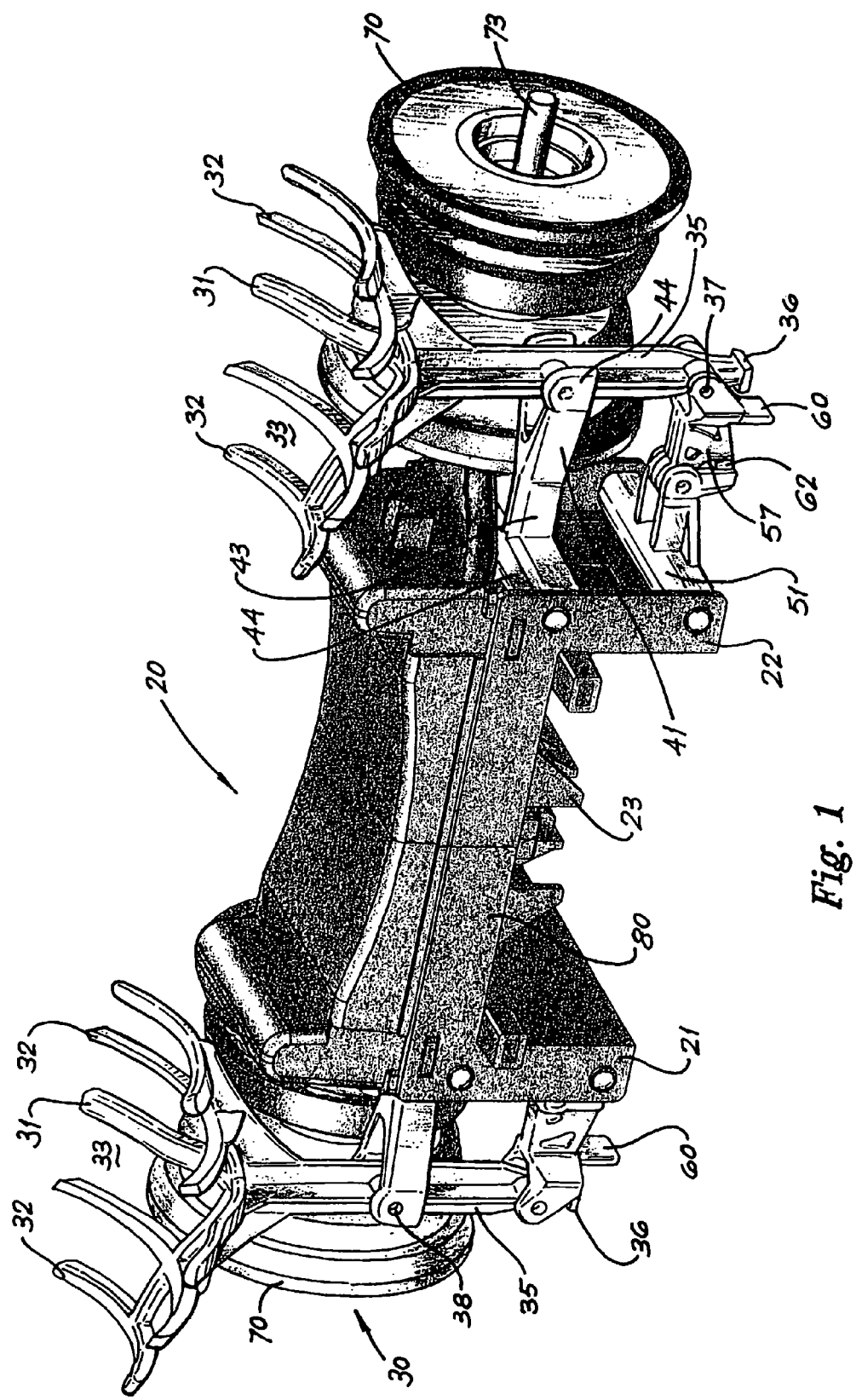
FIG. 1 is a perspective view of a support system that forms part of a conveyor of the fruit handling equipment.

In the system shown in FIG. 1 that is the subject of this application each carriage 20 includes a rectangular platform 80 with a pair of downwardly extending legs 21, 22. The underside of the platform supports a chain clip 23 that allows the carriage to clip onto the chain (not shown) of a conveyor. Each leg 21, 22, supports a T-shaped support cup 30 via a transversely extending parallel linkage 40. By transverse it is understood that the linkage comprises an upper linkage 41 and lower linkage 42 that extend transversely of the conveyor or perpendicular to the line of travel.

Each T-shaped cup 30 comprising a dished recess 31 bordered by five arcuate fingers 32 spaced to define gaps 33 therebetween. The dish shaped cup 31 is supported by a downwardly extended central post 35. The post terminates in a lower abutment surface 36 and is pivotally secured to the lower linkage 42 about a pivot point 37 and to the upper linkage 41 throughout pivot point 38.

As shown in FIG. 1, the upper linkage 41 comprises an elongate bar 43 with a forked end 44 that is pivotably secured about the pivot point 38. The bar 43 supports a transverse beam 45 that is pivotably mounted across projecting flanges formed on the leg 21 or 22.

Figure 5:
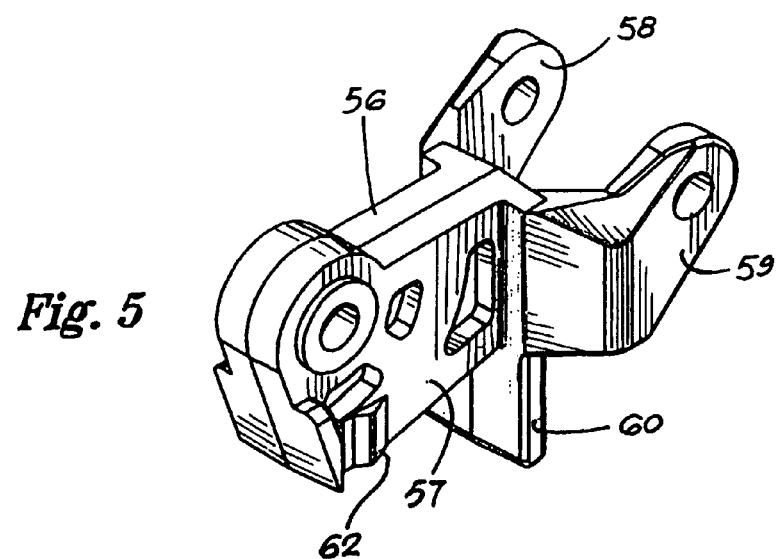
FIG. 5 is a perspective view of an outer component of part of a lower linkage of the support system.
Figure 6A:
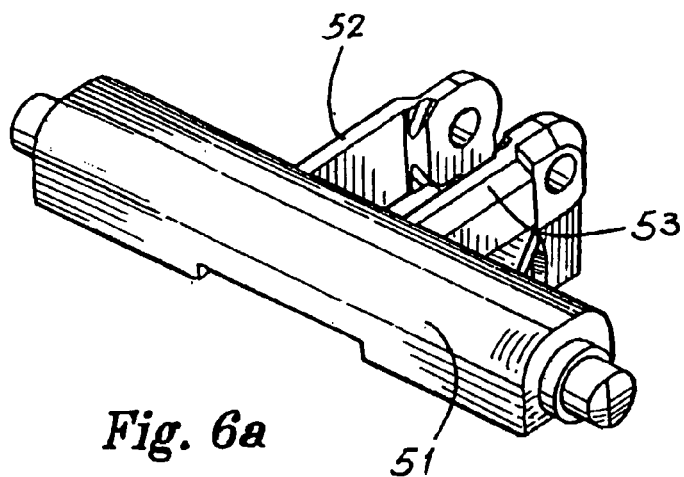
FIGS. 6A and 6B are perspective views of an inner part of the lower linkage.
Figure 6B:
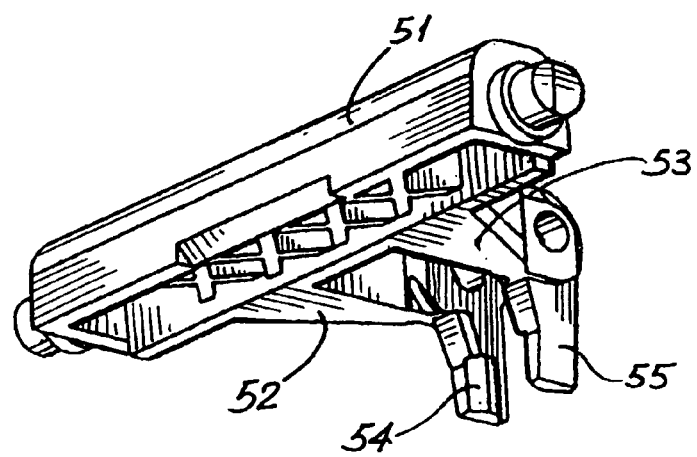
Figure 7:
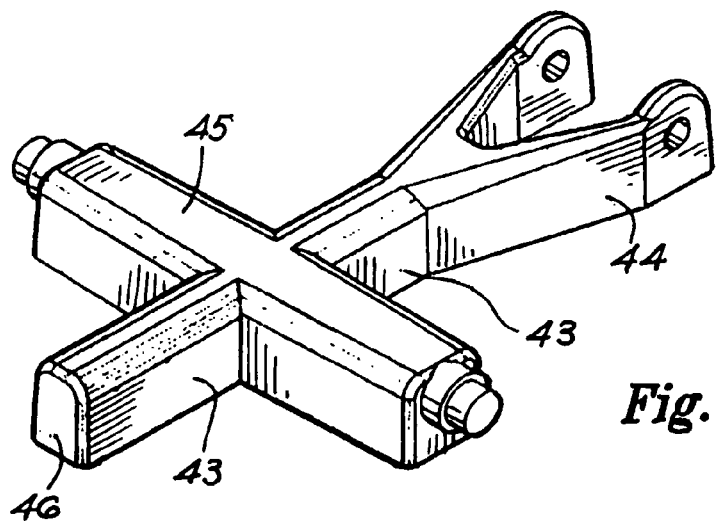
FIG. 7 is a perspective view of the upper linkage.
Figure 8:
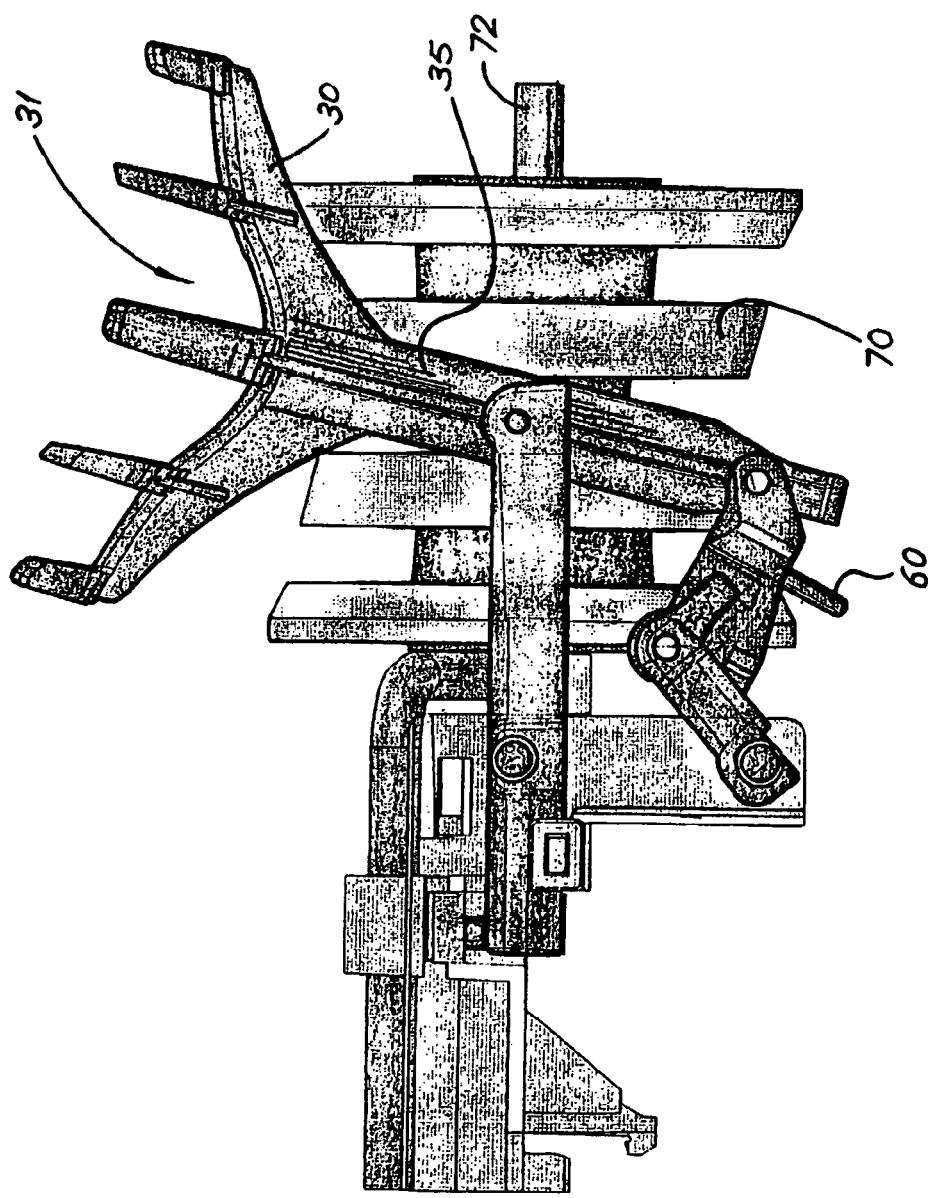
FIG. 8 is an end elevational view of one half with a cup pivotally tilted.

The lower linkage 42 is illustrated in greater detail in FIGS. 5 and 6 and comprises an inner arm 51 (FIG. 6) that is pivotably supported by the flanges of the leg 21 of the carriage 20. The arm 51 has a pair of projecting parallel webs 52, 53 each having downwardly projecting legs 54 and 55. The webs are pivotably secured to either side of an outer linkage 56 (FIG. 5) that has a central body portion 57 with projecting webs 58, 59 that are pivotably secured to either side of the lower pivot point 37 of the post 35. The body portion 57 includes a downwardly extended abutment 60 and a pair of stops 62 on either side of the front face of the forward end. As shown with particular reference to FIGS. 1 & 2 the inner arm 57 and outer linkage 56 operate as an elbow. When in the position shown in FIGS. 1 & 2, the legs 54, 55 abut the stops 62 and the linkage assumes a straight extended position. As shown in FIG. 8 when the abutment 60 is contacted by a solenoid (not shown) it causes the outer linkage 56 to move inwardly and upwardly towards the carriage 20 to reduce the effective length of the linkage 42 causing the lower end of the post 35 to move inwardly towards the carriage causing the fruit carrying cup to tip outwardly to ultimately assume the position in FIG. 9 in which the forward end 46 of the frame 43 abuts a stop 47 on the underside of the platform. In this position the cup 30 is at an angle of 45° to the vertical end the contents have been ejected. To return the cup to the vertical position the underside of the cup recess 31 rides up a ramp (not shown) that has the effect of pushing the cup up to the vertical. At the same time the legs 54, 55 of the inner arm 51 of the lower linkage 42 latch against the stops 62.

Figure 2:
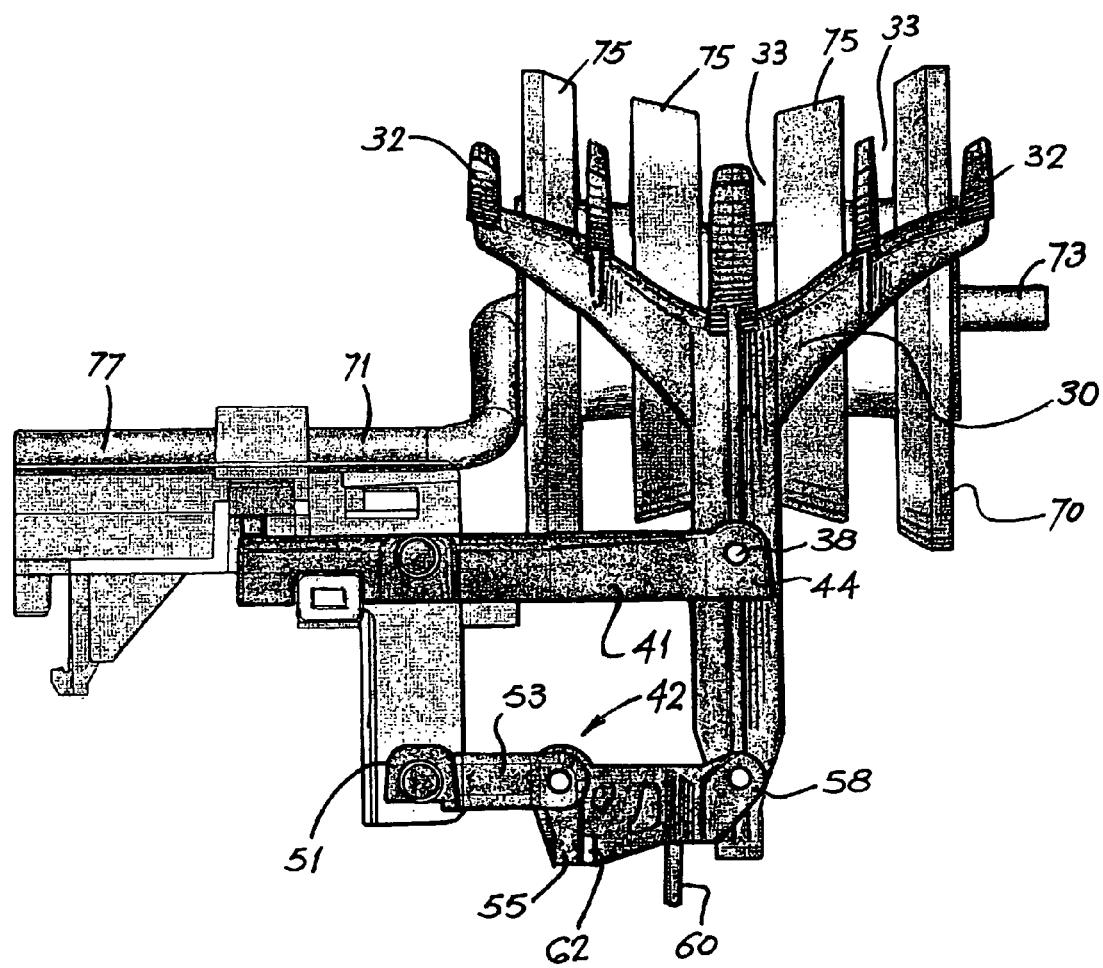
FIG. 2 is an end on elevation of one side of the support assembly.
Figure 10:
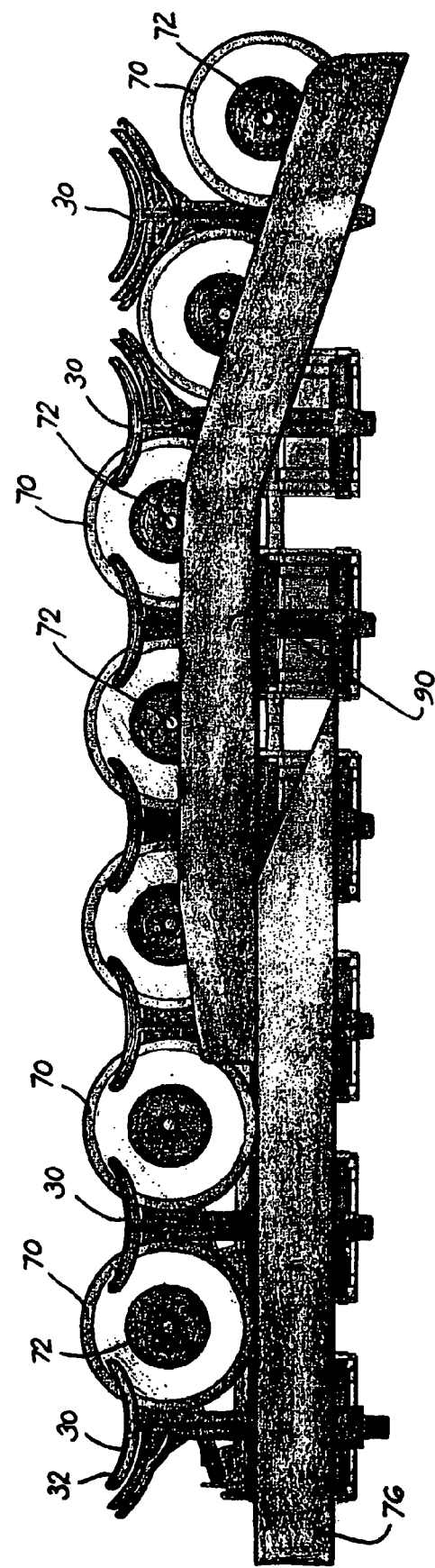
FIG. 10 is a side elevational view of a series of the assemblies coupled to the chain after a photographic zone.

FIG. 1 also illustrates the location of a pair of rollers 70 on a double Z-shaped bar 71 that it clipped across the carriage platform 80. The free ends or stub axles 72, 73 of the bar 71 extend transversely from the carriage and the rollers 70 are in the form of spaced concentric discs 75 with tapering peripheries. The tapering peripheries of the discs 75 are aligned with the gaps 33 between the fingers 32 of the carrying cups 30 as shown in FIG. 2. As shown in FIG. 10 the rollers 70 are arranged to ride up a ramp 76 which causes the bar 71 to pivot about the platform 80 to lift the rollers through the gaps 33 between the fingers 32 to lift the fruit carried on the cup clear of the cup 30. As shown in FIG. 10, the rollers 70 on the adjacent carriage 20 would extend through the right hand side of the carrying cup 30 so that each side of the cup is engaged by the roller peripheries.

Figure 4:
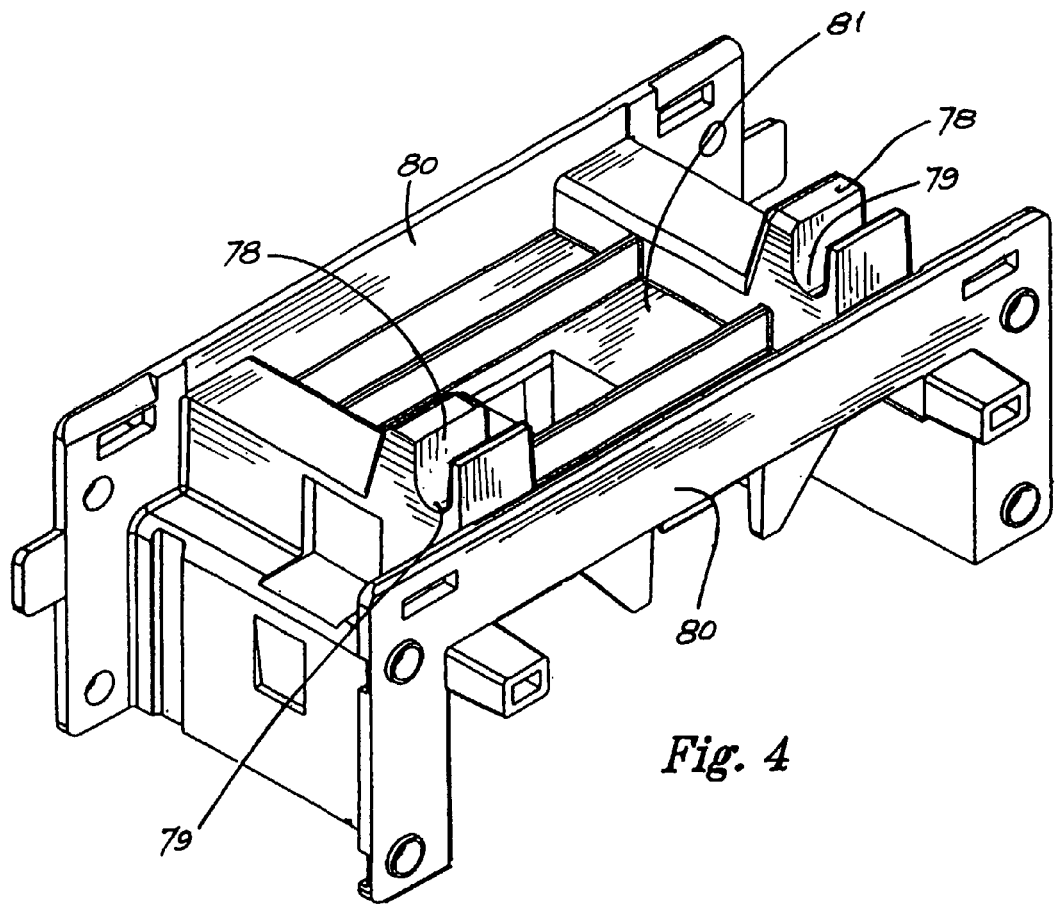
FIG. 4 is a perspective view of a lower half of a carriage that forms part of the support system.

The double Z-shaped bar 71 results in the stub axles 72, 73 being parallel but offset to the central position 77 that is supported by the upper surface of the carriage platform 80 as shown in FIG. 4. The support for the rollers is a single support on the extreme edge at both sides of the carriage. The central portion 77 of the bar locates within elongate slots 78 with arcuate ends 79 formed in the upper surface 81 of the carriage base 80. The location of the central portion 77 of the bar 70 allows it to pivot along its axis but also provides a degree of vertical movement (preferably 3 mm or 4 mm) to accommodate distortions in the assembly that might cause the roller 70 to lift clear of the ramp 76 on one side when lifted by the ramp on the other side. The slight tilting of the bar due to the vertical movement ensures that the rollers remain on the ramps on each side of the conveyor.

FIG. 10 is a side view of the conveyor with the rollers 70 in the upper position projecting through the gaps between the fingers 32 of the conveying cups 30 to lift the fruit clear of the cups.

Although not shown, the rollers 70 are first supported by the stub axles 72, 73 in the upper position as they complete the return pass and become upright as they round the drive sprocket, a first elongated surface (not shown) supports the roller stub axles 72, 73 until the periphery of the rollers engages a friction surface 76 shown in FIG. 10.

The frictional contact of the roller peripheries with the surface 76 causes the rollers to axially rotate which has the effect of causing the fruit to rotate. Although not shown, the fruit move through a photographic zone where they are filmed as they rotate by a CCD camera. When the conveyor moves the fruit past the photographic zone the fruit remain rotating on the rollers 70 that engage the ramps 76. However as shown in FIG. 10 a stabilising ramp 90 then supports the stub axles 72, 73 of the rollers 70. Once the rollers 70 have been supported by their stub axles 72, 73 by the ramp 90 they effectively become disassociated with the friction surface 76 and slowly free-wheel to a stationary position whilst supported on the stabilising ramps 90 that engage the stub axles. The stabilising ramp 90 as shown in FIG. 10 diverges downwardly to lower the rollers 70 to an inoperative position as shown on the right hand side of FIG. 10 in which the fruit are again supported by the cups 30. The subsidiary ramp 90 has the effect of causing the rollers to cease rotating which reduces the likelihood of the fruit bouncing off the cups. Thus when the fruit are lowered onto the cups to be weighed as shown in FIG. 3 they are not rotating and are less likely to bounce off the cups 30.

Figure 3:
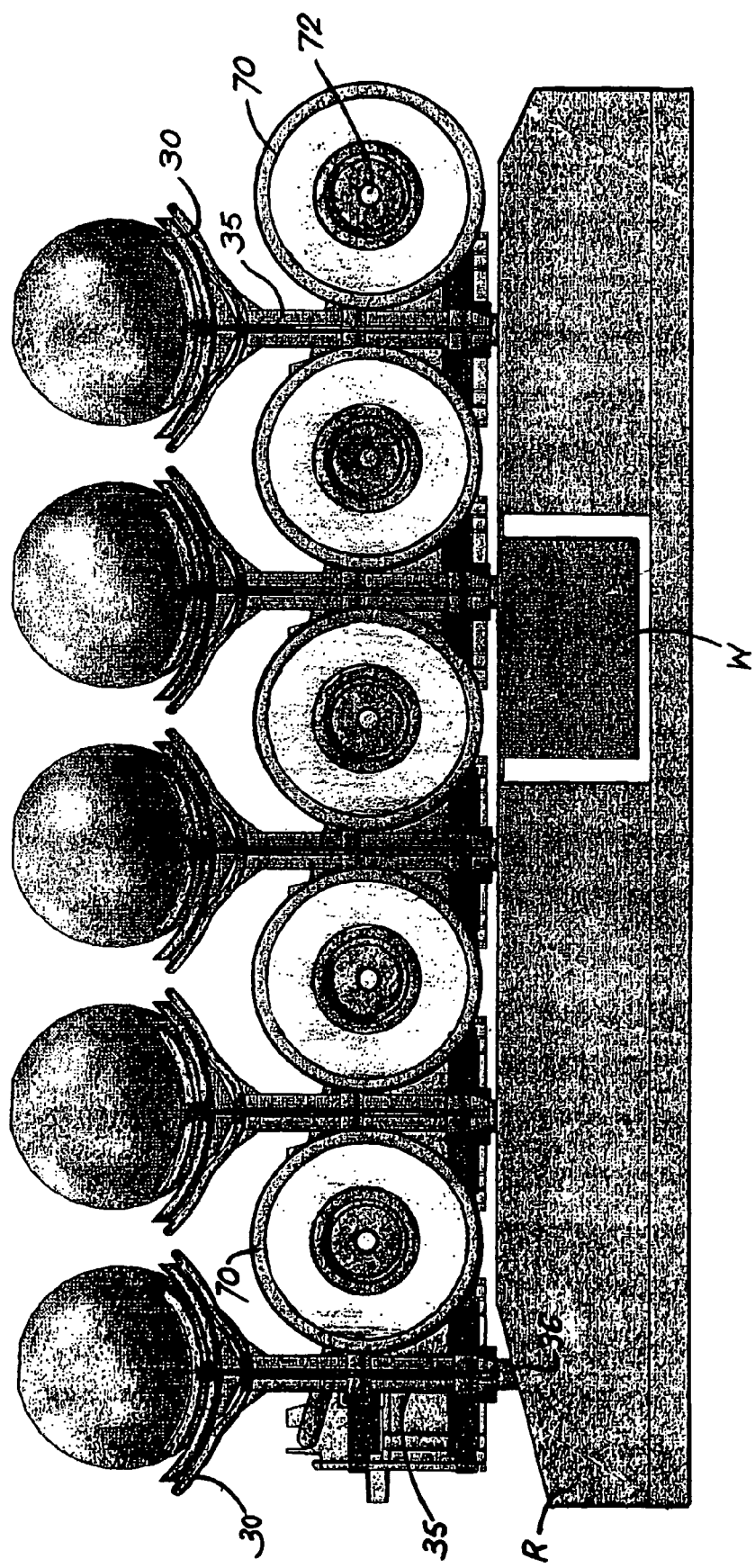
FIG. 3 is a side elevational view of a series the support assemblies attachment is a conveying chain at a weighing zone.

To weigh fruit carried in the cups 30 the rollers 70 assume the lower position shown in FIG. 3 in which there the peripheries are well clear of the underside of each cup 35. The abutment 36 at the end of the post 35 of each cup 30 rides up a ramp R onto a weighing cell W. This causes the cup 30 and linkage 40 to pivot through a small vertical movement causing the post and linkage 40 to disengage from the stop 47 on the underside of the carriage platform 80. In this way, the parallel linkage ensures that there is no component of the horizontal movement in the vertical component that is interpreted by the load cell. The fact that the linkage is a parallelogram allows the load to be borne by the load cell W on a single abutment 36 of a reduced cross-section. This improves the accuracy of the weighing. However, the use of a transverse parallel linkage avoids the need to ensure that the linkage is horizontal or parallel to the load surface. In a longitudinal linkage any deviation from the horizontal or parallel introduces vertical components that distort the load reading and reduce the accuracy. A transverse linkage does not have this constraint and is thus easier to tolerance and set up.

The claims defining the invention are as follows:

1. A conveying assembly for fruit handling equipment comprising: a carriage adapted to be attached to a conveying chain arranged to displace the carriage in a conveying direction, a cup adapted to support a single piece of fruit, the cup being secured to the carriage via a parallelogram linkage extending transversely to the conveying direction, the cup being pivotally secured to the linkage to be moveable from a conveying position to a discharge position, the linkage having release means to cause the cup to pivot relative to the linkage transversely of the conveying direction to the discharge position to effect discharge of the fruit, the linkage allowing the cup to be vertically displaceable to effect weighting of the fruit.

2. The conveying assembly according to claim 1 wherein, a plurality of carriages are attached end to end, along the conveying chain.

3. The conveying assembly according to claim 2 wherein, rollers are positioned adjacent either side of the cup in the conveying direction, the rollers being vertically displaceable to assume an upper position in which the rollers lift the fruit clear of the cup.

4. The conveying assembly according to claim 3 wherein, each roller has an outwardly projecting centrally positioned sub-axle.

5. The conveying assembly according to claim 4 wherein, before the cups pass a photographic zone, the rollers are held in the upper position by a first elongate surface that engages the stub axles.

6. The conveying assembly according to claim 5 wherein, at the photographic zone a friction surface engages the periphery of each roller to cause rotation of the rollers as they move relative to the friction surface to rotate the fruit at the upper position.

7. The conveying assembly according to claim 6 wherein, after the photographic zone a ramp supports each roller by the sub-axle to disconnect the periphery of the roller from the friction surface to allow the roller to free wheel to become stationary, the ramp then lowering the roller allowing fruit to return to the cup.

8. The conveying assembly according to claim 1 wherein, the cup has a concave support surface supported by a centrally positioned post, the post being pivotally secured to the carriage via the parallelogram linkage.

9. The conveying assembly according to claim 8 wherein, the parallelogram linkage comprises parallel spaced upper and lower arms, each arm having ends pivotally connected to the post and the carriage.

10. The conveying assembly according to claim 9 wherein, the lower arm has an elbow joint constituting the release means which can be displaced to a bent configuration thus causing the post and cup to pivot to the discharge position.

11. The conveying assembly according to claim 9 wherein, the upper and lower arms of the parallelogram linkage constitute T-shaped members, the end of the leg of the T being pivotally secured to the post with the head of the T being pivotally secured to spaced apart mounting flanges defined by the carriage.

12. The conveying assembly according to claim 11 wherein, the leg of the upper arm has a foot projecting past the post which engages the carriage to hold the upper arm horizontal.

13. The conveying assembly according to claim 12 wherein, at a weighing zone a ramp engages the base of each post to lift the post slightly about the parallelogram linkage to disengage the foot of the upper arm from the carriage to assume the weighing position.

14. The conveying assembly according to claim 13 wherein, a load cell is positioned in the ramp whereby the base of each post is borne by the load cell to weigh the cup and fruit.

15. The conveying assembly according to claim 1 wherein, the carriage supports at least two transversely spaced apart cups.

16. The conveying assembly according to claim 15 wherein, the rollers of transversely opposed cups are interconnected by a Z-shaped bar that is supported by the carriage to axially pivot to raise or lower the rollers relative to the carriage.

17. The conveying assembly according to claim 16 wherein, the support of the bar allows a degree of vertical displacement of the bar.

* * * * *